April 29, 1924.
B. D. CHAMBERLIN
PHOTOGRAPHIC SHUTTER
Original Filed Jan. 29, 1921   3 Sheets-Sheet 3
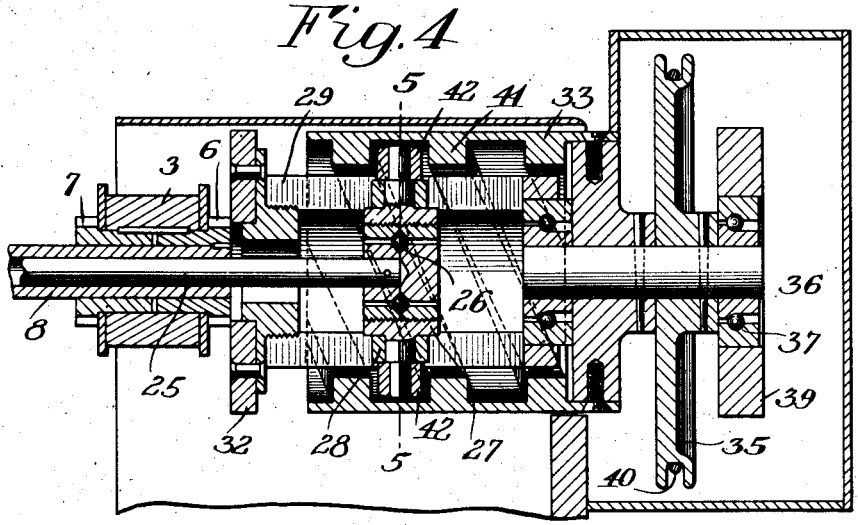
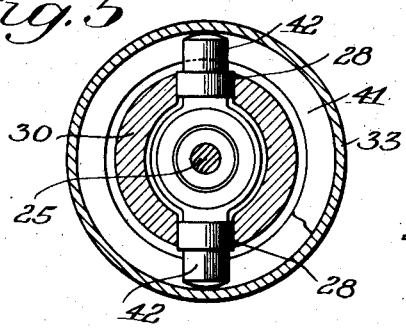
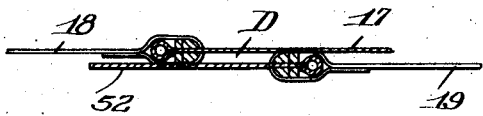
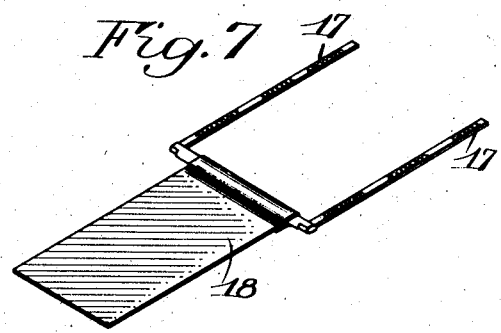
INVENTOR.
Benjamin D. Chamberlin
BY
His ATTORNEY Patented Apr. 29, 1924.

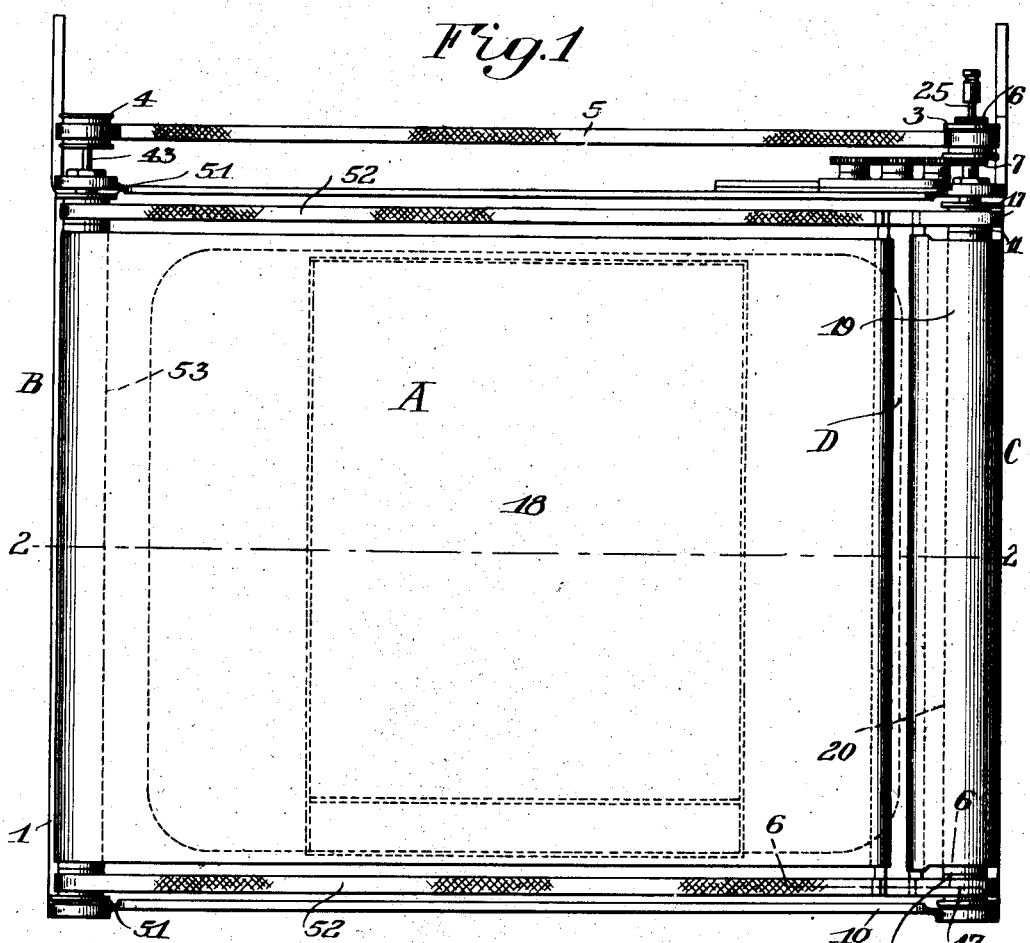
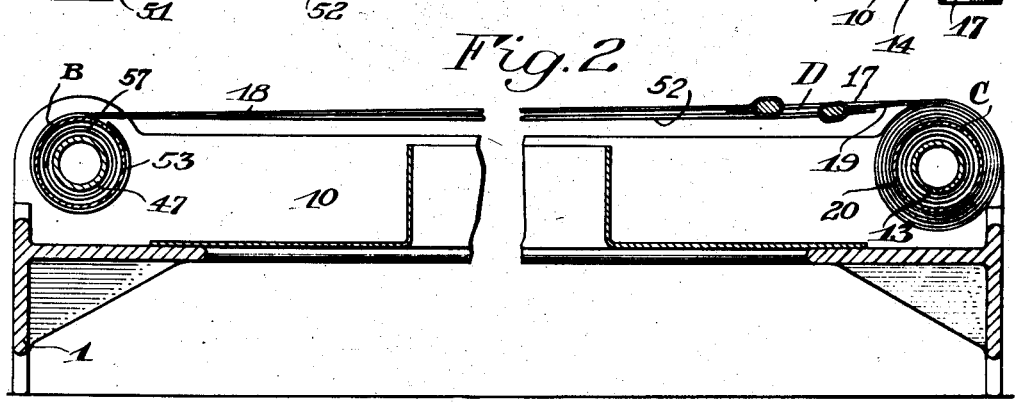

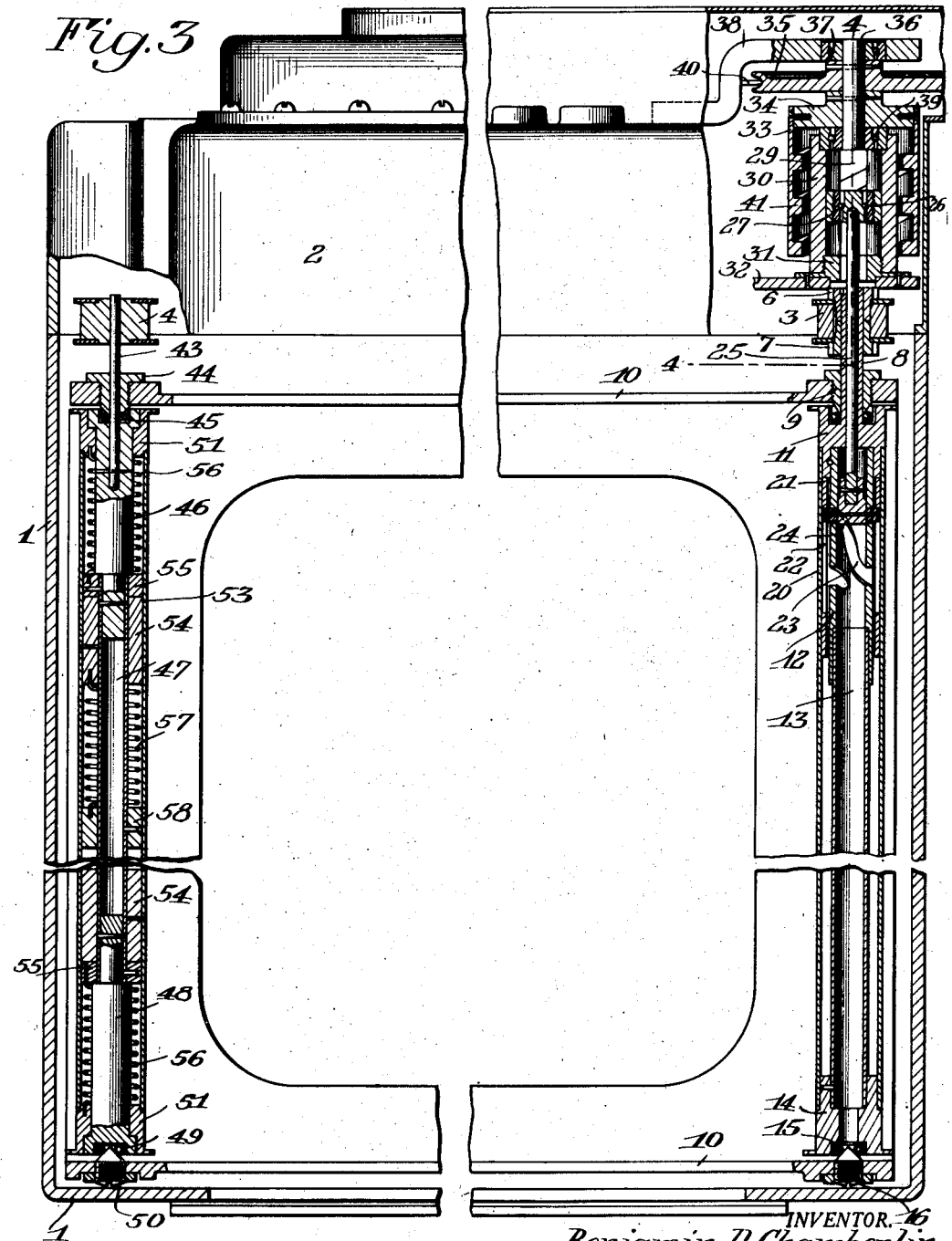

1,492,357

UNITED STATES PATENT OFFICE.

BENJAMIN D. CHAMBERLIN, OF ROCHESTER, NEW YORK, ASSIGNOR TO EASTMAN KODAK COMPANY, OF ROCHESTER, NEW YORK, A CORPORATION OF NEW YORK.

PHOTOGRAPHIC SHUTTER.

Original application filed January 29, 1921, Serial No. 440,908. Divided and this application filed June 27, 1923. Serial No. 648,144.

*To all whom it may concern:*

Be it known that I, BENJAMIN D. CHAMBERLIN, a citizen of the United States, residing at Rochester, in the county of Monroe and State of New York, have invented certain new and useful Improvements in Photographic Shutters; and I do hereby declare the following to be a full, clear, and exact description of the same, reference being had to the accompanying drawings, forming a part of this specification, and to the reference numerals marked thereon.

My present invention relates to photography and more particularly to photographic shutters of the curtain or focal plane type and it has for its object to provide an improved shutter that will be fast and accurate in operation and in which the flexible parts or curtains will be held taut during all movements thereof. The present shutter is particularly designed for use in automatic cameras of the type used in aeroplanes and a further object of the invention is to provide a smoothly operating shutter of this nature that can be readily controlled and that will lend itself to automatic actuation in coordination with other driven parts. To these and other ends the invention resides in certain improvements and combinations of parts all as will be hereinafter more fully described, the novel features being pointed out in the claims at the end of the specification.

In the drawings:

Figure 1 is a plan view of a curtain shutter constructed in accordance with and illustrating one embodiment of my invention.

Figure 2 is an enlarged vertical section therethrough taken on the line 2—2 of Figure 1, the central portion thereof being broken away.

Figure 3 is a horizontal section through a camera to which my improved shutter is fitted taken in the plane of the shutter winding rolls and the controlling mechanism therefor, some parts of the camera being in elevation or broken away.

Figure 4 is an enlarged section through the shutter controlling mechanism taken on the line 4—4 of Figure 3.

Figure 5 is a section on the line 5—5 of Figure 4.

Figure 6 is an enlarged detail section on the line 6—6 of Figure 1 showing the relative positions of the tapes in fixing the shutter aperture and Figure 7 is a detail perspective view much reduced, of one of the curtains of the shutter and its winding tapes.

Similar reference numerals throughout the several views indicate the same parts.

This application is a division of my prior and co-pending application, Serial Number 440,908, filed January 29, 1921, in which is disclosed a complete automatic aeroplane camera fitted with a motor and also with hand driving mechanism and having operating mechanism that automatically actuates in timed relationship film feeding means and other devices including a shutter like that herein contained but as the present application is devoted to the shutter alone, very little of the rest of the camera parts have been shown or require description. I will merely describe the manner in which the driving mechanism of the camera is connected up to the shutter and the point at which the control by the operator is communicated to the shutter from a distance as it is to the other mechanisms of the complete camera.

Aerial cameras of the type indicated are naturally operated in a position in which their optical axes are vertical so that the focal plane of the camera is horizontal and therefore Figure 3 is a horizontal section through the shutter taken just below the focal plane. The shutter mechanism is shown enclosed in the body or casing 1 of the camera at one side of which is a gear case 2 containing parts of the actuating and controlling mechanism and into which parts of the driving and controlling devices of the shutter mechanism project as will hereinafter appear. The shutter comprises winding rolls B and C while D indicates the aperture thereof and the shutter is of such a nature that this aperture is moved across the field of exposure in one direction for one exposure and in the opposite direction for the next exposure. In other words, the shutter has no idle rewinding movement such as most curtain shutters have. This reversal requires the alternate use of the rollers B and C as winding rollers for effecting exposure and requires that one of them be first driven in one direction and then the other one in the opposite direction.

For this purpose, I provide on the shaft of the roller C a common driving pulley or drum 3 and this pulley is connected to a pulley 4 on the roller B by a tape 5 which is wound in opposite directions upon the two pulleys 3 and 4. Therefore, as the pulley or common operating member 3 is rotated in one direction, it winds the roller C and unwinds the roller B while when driven in the opposite direction it winds the roller B with a reverse action on the roller C. Associated with this operating member 3 and locked thereto are two pinions 6 and 7 which have to do with the timing of the shutter operation with relation to the general cycle of operation of the automatic mechanism of the camera but which for present purposes, merely represent driving means alternately used to drive the shutter rollers in either of two opposite directions.

The shutter operating pulley 3 and its associated gears 6 and 7 are fixed to a sleeve 8 turning in a bushing 9 in a shutter frame 10 suitably mounted within the camera body. The sleeve is shown integral with a pulley 11 at one end of the roller C and this pulley is rigidly connected through an inner sleeve 12 and a tube 13 fastened thereto with a similar pulley 14 having a ball bearing 15 on a cone 16 carried in the frame 10 at the other end of roller C. These pulleys 11 and 12 take the winding tapes 17 of the curtain 18 that is wound on roller B. Hence, when the operating pulley 3 is turned in one direction, it winds these tapes and draws the curtain 18 from the opposite roll across the exposure opening maintaining the aperture D between it and the other curtain 19 which curtain is being wound upon roller C in the manner I will now describe.

A curtain winding drum or shell 20 of roller C is mounted at its ends upon tape pulleys 11 and 14 to turn relatively thereto but during the actuation of the shutter just described, the shell and pulleys turn together so that curtain 19 is wound at the same rate as tapes 17 of curtain 18 to maintain the aperture D. The purpose of the relative movement of shell 20 is to vary the size of the aperture D by winding curtain 19 away from curtain 18 while the tape pulleys 11—14 of the latter remain stationary. To this end, there is secured to the inside of shell 20 a tube 21 having longitudinal slots 22 therein. The sleeve 12 within this tube is provided with a spiral cam slot 23 and within the said sleeve is a cross head 24 provided with independent rollers engaging both the spiral slot 23 in the one member and the straight slot 22 in the other. It will be seen therefore that when the cross head is moved longitudinally of the roll, it will turn the shell 20 and the sleeve 12 relatively and hence the shell and the pulleys 11—14 relatively so that the curtain 19 and the tapes 17 of curtain 18 will move in opposite directions widening or narrowing shutter aperture D according to the direction of movement of the cross head.

To effect adjustment of the latter, it is carried upon a longitudinally movable shaft 25 extending through the sleeve 8 of pulley 3 and having a roller bearing 26 in another cross head 27 (Figure 4). This last mentioned cross head has a roller portion 28 operating in a straight longitudinal slot 29 in a tube 30 attached by a collar 31 to a fixed part 32 of the framework. Surrounding this tube 30 is a relatively movable sleeve 33 on the hub 34 of a pulley 35 fixed to a shaft 36. The said shaft has roller bearings 37 in a stationary frame bracket 38 and a roller bearing 39 in the end of fixed tube 30. The sleeve 33 may therefore be turned by pulley 35 over which runs a cable 40 running to the distant hand control described in my said parent application. On the interior of sleeve 33 is a spiral cam track or thread 41 which is engaged by another set of pulleys 42 on cross head 27 whereby, through this pulley adjusting device and the cross head 27, the shaft 25 may be screwed up and down longitudinally within the roll C and cause the other cross head 24 to rotate the curtain shell 20 and the tape pulleys 11—14 relatively converting, by a simple mechanism, rotary motion into rectilinear motion and then back into rotary motion to transmit power through the axis of the roll.

Turning now to roll B, I provide means on this roll for holding both curtains under tension to maintain the aperture D accurate at all times. For this purpose, the tape pulley 4 is mounted on a shaft 43 running through a bushing 44 in frame 10 where it has a roller bearing 45 and is secured in a core piece 46 rigidly connected by a tube 47 to another core piece 48 having a roller bearing 49 on a cone 50 in the opposite end of the frame so that there is, in effect, a continuous shaft or member running straight through the center of roll B. Turning freely thereon at opposite ends are tape pulleys 51 for the tapes 52 of curtain 19. Also turning relatively to the shaft and to the pulleys 51 on which it is mounted at its ends is a curtain winding shell 53. Sleeves 54 secured to this shell turn on the tube 47 while the shell turns freely on collars 55 secured to the tube 47. Two springs 56 coiled about the central shaft member have their ends respectively connected to collars 55 and to the respective tape pulleys 51 so that the latter are placed under tension tending to wind the tapes of curtain 19. A spring 57 at the center encircling the tube 47 has its ends respectively connected to the sleeve 54 of shell 53 and to a collar 58 on tube 47 so that the curtain shell 53 has also a tendency to wind the curtain independently of the tape pulleys and hold it taut. Therefore, when the shutter as a whole is moving toward roll B, the operating pulley 4 is winding the tapes of one curtain and the body of the other curtain through springs that hold them both taut while with the curtain moving in the opposite direction, the same tension is exerted in unwinding both from roll B.

I claim as my invention:

1. In a curtain shutter, the combination with a pair of winding rolls, a curtain on each roll provided with tapes and winding devices on each roll for the tapes of the curtain of the other roll, of a reversible operating member common to both rolls, said member being directly connected to one roll and having a tape connected to actuate the opposite roll in a reverse direction.

2. In a curtain shutter, the combination with a pair of curtains each provided with operating tapes and a winding roll for one curtain and for the tapes of the other, of a roll for said last mentioned curtain having independently movable tape winding devices for the first mentioned curtain, operating means for both rolls and a take-up spring through which the operating means acts upon the tape winding devices of the last mentioned roll.

3. In a curtain shutter, the combination with a pair of curtains each provided with operating tapes and a winding roll for one curtain and for the tapes of the other, of a roll for said last mentioned curtain having independently movable tape winding devices for the first mentioned curtain, operating means for both rolls and a take-up spring through which the operating means acts upon the curtain winding devices of the last mentioned roll.

4. In a curtain shutter, the combination with a pair of curtains each provided with operating tapes and a winding roll for one curtain and for the tapes of the other, of a roll for said last mentioned curtain having independently movable tape winding devices for the first mentioned curtain, operating means for both rolls, a take-up spring through which the operating means acts upon the tape winding devices of the last mentioned roll and another take-up spring through which the operating means acts upon the curtain winding devices thereof.

5. In a curtain shutter, the combination with a pair of curtains each provided with operating tapes and a winding roll for one curtain and for the tapes of the other, of a second winding roll embodying a shaft having relatively movable tape winding pulleys thereon for the tapes of the first mentioned curtain, a relatively movable drum on the shaft between the pulleys for the last mentioned curtain, a spring within the drum connecting the latter to the shaft and a spring within the drum connecting each tape pulley to the shaft.

6. In a curtain shutter, the combination with a pair of curtains each provided with operating tapes and a winding roll for one curtain and for the tapes of the other, of a second winding roll embodying a shaft having relatively movable tape winding pulleys thereon for the tapes of the first mentioned curtain, a relatively movable drum on the shaft between the pulleys for the last mentioned curtain, a spring within the drum connecting the latter to the shaft, a spring within the drum connecting each tape pulley to the shaft, and a common reversible operating member for driving the first mentioned roll and the shaft of the other in opposite directions.

7. In a curtain shutter, the combination with a pair of curtains each provided with operating tapes and a winding roll for one curtain and for the tapes of the other, of a second winding roll embodying a shaft having relatively movable tape winding pulleys thereon for the tapes of the first mentioned curtain, a relatively movable drum on the shaft between the pulleys for the last mentioned curtain, a spring within the drum connecting the latter to the shaft, a spring within drum connecting each tape pulley to the shaft, a driving pulley on the latter, a reversible operating pulley directly connected to the first mentioned roll, and a tape connecting the operating pulley and driving pulley to effect their joint movement in opposite directions.

8. In a curtain shutter, the combination with a pair of curtains each provided with operating tapes and a winding roll embodying a winding drum for one curtain and pulleys, movable relatively thereto, for the tapes of the other, of a second winding roll embodying a shaft having relatively movable tape winding pulleys for the tapes of the first mentioned curtain, a relatively movable drum on the shaft, between the pulleys, for the last mentioned curtain, a spring within the drum connecting the latter to the shaft, a spring within the drum connecting each tape pulley to the shaft, a driving pulley on the latter, a reversible operating pulley directly connected to the first mentioned roll, a tape connecting the operating pulley and driving pulley to effect their joint movement in opposite directions, and means for adjusting the winding drum and the pulleys of the first mentioned roll relatively to each other to vary the aperture between the curtains.

9. In a curtain shutter, the combination with a pair of curtains each provided with operating tapes and a winding roll for one curtain and for the tapes of the other, of a second winding roll embodying a shaft having tape winding pulleys fixed thereon for the tapes of the first mentioned curtain, a relatively movable drum on the shaft for the last mentioned curtain, an axially arranged adjusting device movable endwise through the shaft to adjust the drum and the shaft rotatively relatively to each other, a bearing for the projecting portion of said adjusting device and a reversible operating member for both winding rolls supported jointly by said bearings.

10. In a curtain shutter, the combination with a pair of curtains each provided with operating tapes and a winding roll for one curtain and for the tapes of the other, of a second winding roll embodying a shaft having tape winding pulleys fixed thereon for the tapes of the first mentioned curtain, a relatively movable drum on the shaft for the last mentioned curtain, an axially arranged adjusting device movable endwise through the shaft to adjust the drum and the shaft rotatively relatively to each other, a cross head on the adjusting device, a longitudinal fixed guide therefor, a rotatable spiral cam cooperating with the crosshead and means for operating the cam.

11. In a curtain shutter, the combination with a pair of curtains each provided with operating tapes and a winding roll for one curtain and for the tapes of the other, of a second winding roll embodying a shaft having tape winding pulleys fixed thereon for the tapes of the first mentioned curtain, a relatively movable drum on the shaft for the last mentioned curtain, an axially arranged adjusting device movable endwise through the shaft to adjust the drum and the shaft rotatively relatively to each other, a cross head on the adjusting device fixed thereto for longitudinal movement but provided with a bearing in which the adjusting device may turn with the roll, a longitudinal fixed guide for the cross head, a rotatable spiral cam cooperating with the latter and means for operating the cam.

BENJAMIN D. CHAMBERLIN.